United States Patent [19]

Tung

[11] 4,211,761

[45] * Jul. 8, 1980

[54] PROCESS FOR REMOVAL OF SULFUR DIOXIDE FROM GASEOUS MIXTURES

[76] Inventor: Shao E. Tung, 91 Blake Rd., Brookline, Mass. 02146

[ * ] Notice: The portion of the term of this patent subsequent to Oct. 5, 1993, has been disclaimed.

[21] Appl. No.: 838,913

[22] Filed: Oct. 3, 1977

Related U.S. Application Data

[63] Continuation-in-part of Ser. No. 728,174, Sep. 30, 1976, Pat. No. 4,101,643, which is a continuation-in-part of Ser. No. 499,582, Aug. 22, 1974, Pat. No. 3,984,529.

[51] Int. Cl.$^2$ .................. C01B 17/48; C01B 17/00
[52] U.S. Cl. .................. 423/539; 423/243; 423/242
[58] Field of Search .......... 423/242, 243, 539, 181; 210/26, 37 R; 550/73

[56] References Cited

U.S. PATENT DOCUMENTS

| | | | |
|---|---|---|---|
| 1,946,489 | 2/1934 | DeJahn | 423/539 |
| 2,128,027 | 8/1938 | Clark | 423/243 |
| 3,633,339 | 1/1972 | Wiewiorowski | 423/242 |
| 3,684,219 | 3/1972 | Lynn et al. | 423/181 |
| 3,779,907 | 12/1973 | Li et al. | 210/37 R |
| 3,833,710 | 9/1974 | Deschamps et al. | 423/242 |
| 3,896,214 | 7/1975 | Newman | 423/242 |
| 3,911,093 | 10/1975 | Sherif | 423/242 |
| 3,984,529 | 10/1976 | Tung | 423/242 |
| 4,029,744 | 7/1977 | Li et al. | 423/539 |
| 4,080,423 | 2/1978 | Smith et al. | 423/242 |
| 4,101,643 | 7/1978 | Tung | 423/575 |

FOREIGN PATENT DOCUMENTS

400998 11/1933 United Kingdom ............ 423/243

Primary Examiner—O. R. Vertiz
Assistant Examiner—Gary P. Straub
Attorney, Agent, or Firm—William R. Laney

[57] ABSTRACT

A process for removing sulfur dioxide from a mixture of gases and converting the removed $SO_2$ to elemental sulfur. The sulfur dioxide is first contacted in a scrubbing zone with a scrubbing agent which is an aqueous solution of an alkali metal salt of a weak acid which has an ionization constant (pKa) value of at least 3.5. The pregnant scrubbing solution is then contacted with an organic transfer reactant which is a water immiscible, water insoluble amine salt to effect a transfer reaction by which the sulfite ions are transferred to the non-aqueous phase by way of an ion exchange reaction. The sulfur bearing, non-aqueous phase is next heated to decompose the sulfite, releasing sulfur dioxide and a water immiscible, water insoluble amine-bearing compound. The amine-bearing compound is next contacted with the alkali metal salt scrubbing solution from the transfer step. After this contact, the regenerated aqueous scrubbing solution is recycled to the scrubber, and the rengenerated organic solution is recycled to ion exchange with additional pregnant scrubbing solution.

6 Claims, 1 Drawing Figure

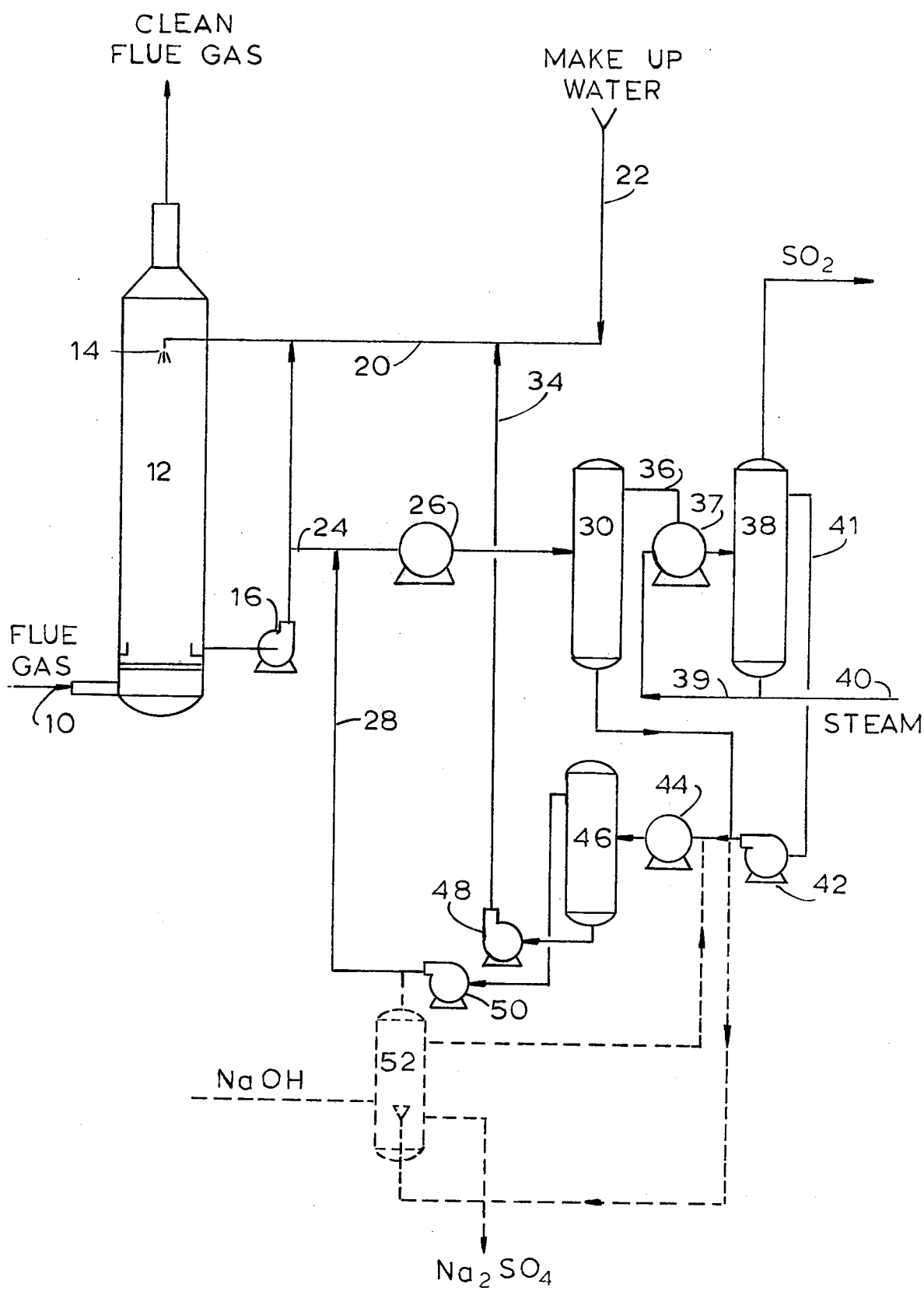

PROCESS FOR REMOVAL OF SULFUR DIOXIDE FROM GASEOUS MIXTURES

RELATED APPLICATIONS

This application is a continuation-in-part of my U.S. Pat. Application Ser. No. 728,174 filed Sept. 30, 1976 now U.S. Pat. No. 4,101,643, which application is a continuation-in-part of my U.S. Application Ser. No. 499,582 entitled "Process for Recovering Sulfur by Removal of Sulfur Dioxide from Gaseous Mixtures" filed Aug. 22, 1974, and now U.S. Pat. No. 3,984,529 issued on Oct. 5, 1976.

BACKGROUND OF THE INVENTION

1. Field of the Invention

This invention relates to a process for removing relatively small quantities of sulfur dioxide gas from gaseous mixtures.

2. Brief Description of the Prior Art

In my U.S. Pat. No. 3,984,529, I review various prior efforts to provide economical and efficient processes for removing sulfur dioxide gas from gaseous mixtures, such as stack gases or the like. Removal of sulfur dioxide is desirable in order to obviate or reduce atmospheric pollution, and also in order to avoid the loss of the economic value represented by the recovered sulfur or sulfur compounds constituting potential end products of the recovery process.

In my referenced patent, I describe procedures and certain proposed methods which generally include the step of initially contacting the gaseous mixture which contains the sulfur dioxide with an aqueous solution containing a removal reactant so as to form a condensed phase in which the removed sulfur dioxide is combined chemically with the removal reactant in the form of sulfite or hydrosulfite compounds in aqueous solution. The removal reactants contemplated for use in the processes described include, inter alia, alkali metal hydroxides, and salts of weak acids and alkali metal hydroxides.

After formation of the pregnant scrubbing solution which contains compounds including combined sulfite ions derived from the extracted $SO_2$ gas, the pregnant scrubbing solution is contacted with an organic liquid phase which includes, as an active component, certain nitrogen-containing water-immiscible organic compounds which have specified properties. Among such compounds which are effective and are preferred at this point in the process are various types of long chain alkyl amines which contain from about 12 to about 45 carbon atoms, and have a solubility in water of less than 0.2 gm/100 gms of water at 25° C., and the water immiscible salts of these basic compounds. When the amine salts are used as the transfer reactants, their water solubility should not exceed about 5 gms/100 gms of water at 25° C. Such amine salts are generally derivable from free amines having the degree of immiscibility prescribed above. The result of contacting the pregnant scrubbing solution with the described amine-containing organic liquid phase is to transfer the sulfite ions from the pregnant aqueous scrubbing solution to the organic phase as a result of chemical combination of sulfite ions with the long chain alkyl amines. A concomitant result of the described contact is the regeneration of the scrubbing solution containing the selected removal reactant so that it can be recycled to the scrubbing zone, and used for contacting the gaseous mixture from which additional $SO_2$ is to be subsequently removed.

The organic phase developed upon contact of the long chain amine with the pregnant scrubbing solution contains long chain amine sulfites, and is contacted with hydrogen sulfide so as to reduce the sulfur-containing salts therein to elemental sulfur, and concurrently regenerate the long chain amine. The amine can then be reutilized for contacting additional sulfite-containing pregnant scrubbing solution from the scrubbing zone for the purpose of repeating the transfer of sulfite ions into the organic phase.

When an amine salt is used instead of an amine as the transfer agent, the transfer step will yield an acid in the aqueous phase. This acid can be removed by contacting this aqueous phase with the organic phase from the reduction step where the regenerated amine will combine with the acid to form the amine salt. After this "recontact", the aqueous solution can be recycled to the scrubber and the organic phase can be utilized as recycled transfer agent.

As described in my co-pending U.S. Application Ser. No. 728,174, an improvement on the foregoing described basic process comprises initially contacting the gas from which the sulfur dioxide is to be removed with an aqueous solution of an alkali metal sulfite. In the course of this scrubbing step, the $SO_2$ in the gaseous mixture combines with the alkali metal sulfite to yield the hydrosulfite salt in aqueous solution. The pregnant aqueous solution resulting from scrubbing is next contacted with a liquid organic phase which contains one or more substantially water-immiscible long chain amine compounds capable of extracting sulfite ions from the pregnant scrubbing solution by chemical combination therewith. Upon the termination of intimate contact between the organic extractant phase and the aqueous phase, the alkali metal sulfite is regenerated in the aqueous phase so that the scrubbing solution thus formed can be recycled to the scrubbing zone of the process. The organic phase, which contains long chain amine sulfites upon completion of the transfer reaction, is then heated to a temperature sufficiently high that the amine sulfites therein undergo thermal decomposition to yield sulfur dioxide. The decomposition of the amine sulfites concurrently produces free amines which can be reused in carrying out further extraction of sulfite ions from additional scrubbing solution.

The sulfur dioxide generated by decomposition of the amine sulfite in the organic phase can be used as an end product, or it can be converted to elemental sulfur by various conventional methods known to the art.

In this process, high efficiency in the scrubbing step is achieved by using a regenerated scrubbing solution which has a high pH value. The pH value can be as high as 7. High efficiency in the extraction step is also achieved because the selectivity in this step of the process is as high as 100% (i.e., only sulfite ions are transferred into the organic phase.)

BRIEF DESCRIPTION OF THE PRESENT INVENTION

The present invention comprises an improved process for efficiently removing sulfur dioxide from a gaseous mixture containing the removed gas in small quantity. The end product produced by the process can be concentrated sulfur dioxide or elemental sulfur.

Broadly described, the process of the invention comprises initially contacting the gas from which the sulfur dioxide is to be removed with an aqueous solution of an alkali metal salt. In the course of this scrubbing step, the SO₂ in the gaseous mixture combines with the alkali metal sulfite to yield the hydrosulfite salt in aqueous solution. The pregnant aqueous solution resulting from scrubbing is next contacted with a liquid organic phase which contains one or more substantially water-immiscible long chain amine compounds capable of ion exchange with the sulfite ions from the pregnant scrubbing solution. Upon the termination of intimate contact between the organic extractant phase and the aqueous phase, aqueous scrubbing solution is partially regenerated. The organic phase, which contains long chain amine sulfites upon completion of the ion exchange reaction, is then heated in the presence of water to a temperature sufficiently high that the amine sulfites therein undergo hydraulic/thermal decomposition to yield sulfur dioxide. The decomposition of the amine sulfites concurrently produces free amines and these are next brought into contact with the partially regenerated scrubbing solution. Upon the completion of this recontact step, the aqueous regenerated scrubbing solution can be recycled to the scrubbing zone of the process, and the organic layer containing amine salt can be re-used in carrying out further ion exchange of sulfite ions from additional scrubbing solution.

The sulfur dioxide generated by decomposition of the amine sulfite in the organic phase can be used as an end product, or it can be converted to elemental sulfur by various conventional methods known to the art.

An important object of the invention is to provide a process for removing sulfur dioxide from a mixture of gases, which process produces an amine sulfite as an intermediate composition in the course of the process, and which process further entails the hydraulic thermal decomposition of the amine sulfite without the simultaneous occurrence of the formation of any significant amount of a sulfate product.

A further object is to provide an amine sulfite intermediate product which can thermally decompose at relatively low temperature.

An additional object is to decompose the amine sulfite intermediate product in the presence of water. Water will catalyze the decomposition reaction and thus further lower the temperature level to decomposition.

A further object of the invention is to provide, in combination with the basic process of the invention, a simple and effective sulfate removal procedure which functions to continuously remove a constant amount of sulfate from the process streams, thus avoiding undesirable sulfate build-up in the process streams as a result of the removal of small amounts of SO₃ from the gaseous mixture treated in the process.

Another object of the invention is to provide a process for removal of SO₂ from gaseous mixtures, using as a scrubbing agent, an alkali metal salt solution which is less susceptible to air oxidation than an alkali metal sulfite solution.

Another object of the invention is to provide a process for removing sulfur dioxide from a mixture of gases, and entailing the steps of scrubbing the gaseous mixture, followed by extracting sulfite ions from the pregnant scrubbing solution, and ultimately, releasing sulfur dioxide gas from the organic phase from the extraction or transfer zone by heating the organic phase. The heat input required to attain the decomposition of sulfite compounds formed during the transfer reaction is relatively low as compared with some other types of prior art processes in which the end formed product is sulfur dioxide produced by thermal decomposition.

A further advantage of the invention is revealed by comparing an amine salt (e.g. $(RNH_3)_2HPO_4$) with a free amine (e.g. $RNH_2$) as a transfer agent. The $(RNH_3)_2HPO_4$ will hold more protons than $RNH_2$ after the transfer. That is, the transfer products, using $(RNH_3)_2HPO_4$ as the transfer agent, are relatively more rich in hydrosulfite than the transfer products obtained using $RNH_2$ as the transfer agent. Since the hydrosulfite is more easily decomposed, the transfer products obtained using $(RNH_3)_2HPO_4$ will decompose at a lower temperature. Lower temperature decomposition is important because it further reduces undesirable side reactions that result in the loss of the amine functional group.

Another advantage of using an amine salt (e.g. $(RNH_3)_2HPO_4$) as a transfer agent, instead of the free amine (e.g. $RNH_2$), is that in the former case, the scrubbing agent will be essentially alkali metal monohydrogen phosphate, while in the latter case, the scrubbing agent will be alkali metal sulfite. Some of the sulfite can be oxidized to sulfate by contact with air during the scrubbing process, but such oxidation does not occur if alkali metal monohydrogen phosphate is used as the scrubbing agent.

Among the additional objects and advantages which are achieved by the process of the present invention are:

The size of the apparatus and equipment which is required to carry out the process is small in comparison to the equipment previously used in many cases for removing noxious gases from industrial effluent gases.

The process of the invention requires a relatively low capital investment cost.

The operating cost of the process of the invention is low.

The process of the invention is highly reliable for continuous and uninterrupted operation.

The process can be employed to produce easily handled solid elemental sulfur as an end product.

The process can operate at relatively low temperature and at atmospheric pressure.

The process presents no severe corrosion problems.

Practically all of the process streams of the invention are pumpable.

Additional objects and advantages of the invention will become apparent as the following detailed description of preferred embodiments of the invention is read in conjunction with the accompanying single figure of the drawing which illustrates apparatus which can be utilized in carrying out the process of the invention.

DETAILED DESCRIPTION OF PREFERRED EMBODIMENTS OF THE INVENTION

The partial pressure of sulfur dioxide in the gas phase over an aqueous sulfite solution is prescribed by the following equilibrium relationships:

$$SO_2 + H_2O \rightleftharpoons H_2SO_3 \rightleftharpoons H^+ + HSO_2^-$$

$$k_1 = \frac{(H^+)(HSO_1^-)}{(H_2SO_3)}$$

or $$\frac{(H_2SO_3)}{(HSO_3)} = \frac{(H^+)}{k_1}$$

in which the terms in parentheses are concentration terms, and $k_1$ designates the first ionization constant of sulfurous acid ($H_2SO_3$). Further ionization of hydrosulfite is here neglected. These relationships signify that the partial pressure of sulfur dioxide in the gas phase is substantially proportional to the concentration of non-ionized sulfurous acid in the liquid phase. The dissolved sulfur dioxide, however, can also exist as hydrosulfite ions, and proportionining between the non-ionized and ionized species of sulfite depends on hydrogen-ion concentration, pH, as well as the ionization constant, k. Consequently, if the removal compound dissolved in the scrubbing solution is such that the hydrogen-ion concentration is buffered at 1/50 the value of $k_1$, 1/50 of the total dissolved sulfur dioxide will exist in the solution as non-ionized sulfurous acid and the solubility of sulfur dioxide in the aqueous solution of removal compound will then be approximately 50 times its solubility in water.

The ionization constant $k_1$ is $1.54 \times 10^{-2}$ at 25° C. If 50 times better $SO_2$ solubility than in water is adopted as the desirable minimum dissolving capacity that a scrubbing solution should have to warrent any practical consideration, then this scrubbing liquor should be buffered at a hydrogen ion concentration of $(1/50) \times 1.54 \times 10^{-2}$, or $3.08 \times 10^{-4}$, or a pH of 3.51 (or approximately 3.5). The pH of the scrubbing liquor (containing the removal compound) should thus be at least 3.5.

Where the scrubbing solution consists of a strong base-weak acid salt in aqueous solution, the solution is buffered to provide the strongest buffering action, which status occurs when the hydrogen ion concentration is about equal to the ionization constant of the weak acid from which the salt is derived. Therefore, considering the pH limitation hereinbefore described, to warrant practical consideration as a strong base-weak acid salt useful as a removal reactant in the present invention, the pKa of the parent acid of the salt must be larger than 3.5.

In examining the $SO_2$ absorption conditions more closely, the following equilibrium relationships are derived for a salt buffered system:

$$S = \frac{(H^+)^2 + k_1(H^+) + k_1 k_2}{k_1(H^+) + 2k_1 k_2} \left[ (H^+) + \left( \frac{k_b(H^+)}{k_w + k_b(H^+)} - \frac{k_a}{k_a + (H^+)} \right) C - (OH^-) \right] \quad (1)$$

$$P_{SO_2} = \frac{h(H^+)^2}{(H^+)^2 + k_1(H^+) + k_1 k_2} S \quad (2)$$

where S is the total molar concentration of dissolved $SO_2$ in moles per 1000 grams of water; C is the total molar concentration of the anions present in the original salt (removal reactant), $P_{SO_2}$ is the partial pressure of the sulfur dioxide in the gas phase, $k_a$ and $k_b$ are the acid and base ionization constants of the parent acid and base that form the salt removal reactant; $k_1$, $k_2$ are the ionization constants of sulfurous acid, h is a Henry law constant for sulfur dioxide in water and $k_w$ is the water ionization constant, or $10^{-14}$.

Equations (1) and (2) can be used to compute the minimum pKa value a weak parent acid of an alkali metal or ammonium salt (removal reactant) must have, in order to achieve a desired level of equilibrium sulfur loading (solution of $SO_2$) under a certain set of operating conditions. Thus, for example, if the concentration of a removal reactant in the scrubbing liquor is 8 moles/100 moles water (which is a convenient concentration of the scrubbing liquor to use in actual application. For some salts, even higher concentration is permissible by their solubilities), and the sulfur dioxide concentration in the gaseous mixture from which it is to be removed is 2000 ppm, and the scrubbing liquor temperature is 150° F., then the pKa of the parent weak acid from which the salt used as removal reactant is derived must exceed 7.2 (or about 7) in order to achieve a 90 percent sulfur loading (i.e., $S/C=0.9$). This minimum pKa value decreases to 5.1 (or about 5) to achieve a 70 percent equilibrium sulfur loading if the corresponding operating conditions are: 4 moles/100 moles water, 5000 ppm and 100° F., respectively. From this computation, it can be seen that if a salt of a strong base (alkali metal) and a weak acid is used as the removal reactant, the pKa of the parent weak acid should be at least larger than 3.5 and is preferably larger than 5. Further, the computation demonstrates that for best results, the pKa of the parent weak acid should be larger than 7.

In the process of the present invention, and using $Na_2HPO_4$ solution as a scrubbing agent for example purposes, the initial scrubbing reaction can be written as:

$$Na_2HPO_4 + H_2O + SO_2 \rightarrow NaH_2PO_4 + NaHSO_3 \quad (3)$$

In the second step, when an amine salt (e.g. $(RNH_3)_2HPO_4$) is used as a transferring agent, the chemical reaction may be typically represented by

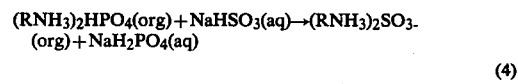

$$(RNH_3)_2HPO_4(org) + NaHSO_3(aq) \rightarrow (RNH_3)_2SO_3(org) + NaH_2PO_4(aq) \quad (4)$$

and to some extent, the following reactions may take place:

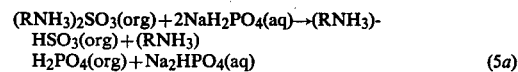

$(RNH_3)_2SO_3(org) + 2NaH_2PO_4(aq) \rightarrow (RNH_3)HSO_3(org) + (RNH_3)H_2PO_4(org) + Na_2HPO_4(aq) \quad (5a)$

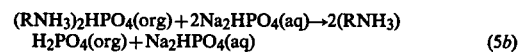

$(RNH_3)_2HPO_4(org) + 2Na_2HPO_4(aq) \rightarrow 2(RNH_3)H_2PO_4(org) + Na_2HPO_4(aq) \quad (5b)$

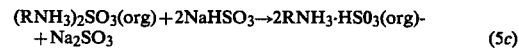

$(RNH_3)_2SO_3(org) + 2NaHSO_3 \rightarrow 2RNH_3 \cdot HSO_3(org) + Na_2SO_3 \quad (5c)$ The actual situation is more complex. The scrubbing solution after the transfer reaction for instance may contain some sodium sulfite through the reaction

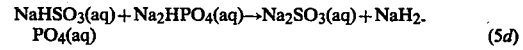

$NaHSO_3(aq) + Na_2HPO_4(aq) \rightarrow Na_2SO_3(aq) + NaH_2PO_4(aq) \quad (5d)$ A suitable amine salt transfer agent for use in this invention should have the following attributes:

1. Its negative ion component should be derived from an acid whose pKa value should be not less than 3.5, preferably ranging between 5.0 and 10.0, and most preferably between 7 and 8;

2. Its positive ion component should contain at least one functional group of the type $-NH_2$, $>NH$, $>N-$ and

3. The solubility of the amine salt should be less than 5 gms amine salt per 100 gms water at 25° C.;

4. The G value that defines the transfer capability of the amine salt should be larger than 0.15, and preferably is larger than 0.3. The most suitable salts have a G value exceeding 0.4. An explanation and definition of G value is set forth in my U.S. Pat. No. 3,984,529 and also hereinafter. When an amine salt (e.g. $(RNH_3)_2HPO_4$) is used as a transfer agent, it is usually advisable, although not always necessary, that the amine salt and scrubbing salt have the same anion (i.e. $HPO_4^=$). In that case, the pKa value of the parent acid of the amine salt, as stated earlier, should be not less than 3.5, and is preferably above 5.0, and most preferably above 7.0. As will be further discussed later, it should also preferably be below 10.0, and most preferably below 8.0. A preferred amine salt is $(RNH_3)_2HPO_4$ derived from the corresponding parent acid $H_2PO_4^-$.

As a general guideline, the amine salts suitable for use as transfer agent should have a water solubility less than 5 gms per 100 gms water at 25° C. Such amine salts can usually be derived from a parent amine having a water solubility no larger than 0.2 gms per 100 gms of water at 25° C. Among the suitable parent amines are long chain alkyl primary, secondary and tertiary amines. When alkyl amines are so used, the function of the long chain alkyl group is essentially to render the amine hydrophobic (i.e., organic soluble) rather than hydrophilic (i.e., water soluble). To fulfill this functional requirement, the 'alkyl substituents' of the nitrogen atoms in the transfer reactants, as here defined, can be straight chain or branched, and the hydrogen atoms attached to the carbon atoms of the carbon chain can be substituted in varying degree with substituents and structural or functional groups which are chemically inert with respect to the reactants and solvents encountered in the transfer reaction, as long as such substitution does not materially lower the transfer capacity (or G value) of the parent transfer reactant before substitution.

In addition to alkyl groups of the type which are normally defined as saturated hydrocarbon chains, carbon chains (substituted or unsubstituted) with unsaturate bonds are also usable, since the presence of the unsaturation does not significantly affect the hydrophobic nature of the amine. However, the presence of unsaturated bonds must not materially change the chemical inertness or materially lower the transfer capacity (or G value) of the amines. Hence a better term to more suitably describe the transfer agents is long chain aliphatic amines (substituted or unsubstituted) rather than alkyl amines. Aromatic amines in which the nitrogen atom of the amine group is a part of the six-member ring are generally unsuitable because their transfer capabilities are generally too low. As will be explained in more detail hereinafter, the transfer capability or basicity of the parent amine is also an important consideration.

The water immiscibility of the parent amine is necessary so that the regenerated scrubbing liquor from the transfer reaction can be separated directly from the organic phase and recycled to the scrubber. High water solubility indicates that higher leakage of the amine transfer reactant into the water phase will occur, or such leakage will occur to the regenerated aqueous scrubbing liquor. High leakage of this type is undesirable, even though the overall process is a closed process.

Generally, with aliphatic amines, suitable water-immiscible parent amines will havw aliphatic substitutents containing at least 12 carton atoms. In the case of some highly branched amines (e.g., highly branched tertiary alkyl primary amines), however, the aliphatic groups may have as few as 8 carbon atoms and still exhibit sufficient water immiscibility. 1-4 dimethyl pentylamine, a $C_7$ alkyl amine, has a water solubility below 0.2 gm 100 gms water, and can also be used as parent amine of the amine salts in admixture with amines having 8 or more carbon atoms. The parent amines preferably do not contain more than 45 carbon atoms in the several alkyl substituents.

Another characteristic which must inhere in the transfer reactant is that such compound must not form a stable emulsion with the aqueous solution. The transfer reactant must be an organic-soluble compound, or itself be a liquid capable of providing a distinct organic phase when contacted with the spent aqueous scrubbing liquor.

It is generally desirable, although not always necessary, to dissolve the water-immiscible amine salt in a water-immiscible oganic solvent, such as kerosene. Since the amine sulfite salt formed is water insoluble, but is organic soluble, the net result of this transfer reaction is the transfer of the sulfite ion from the aqueous phase to the organic phase.

In order to consider in greater detail the tranfer capability of transfer reactants useful in the present invention, a parameter referred to as "G value," and hereinafter defined, can be advantageously employed as a measure of transfer capability. It is generally preferred to use a transfer reactant having a high "G value," thus attaining relatively high efficiency in effecting the transfer of sulfite anions from the salts present in the pregnant scrubbing solution to organo-sulfite compounds of the type heretofore described.

In general, any organo-nitrogen salt derived from a characteristic basic functional group of the type $-NH_2$, $>NH$, $>N-$ and

displays some "transfer capability" for hydrosulfite anions. The "transfer capability" can be defined in several ways, such as in terms of the distribution o sulfite ions as between the organic and aqueous phases present in the transfer reaction system. A more suitable mode of defining the "transfer capability" of the transfer reactant, however, is in terms of a "G value," which is defined as, $$G = \frac{\text{Equivalents of sulfur in a kerosene base organic phase}}{\text{Total moles of amine in kerosene}} \quad (6)$$

It will be seen in referring to Equation (6) that the G value is an expression of the efficiency of transfer of sulfite ions from the aqueous to the organic phase, based upon the degree to which all of the moles of amine cations present in the organic phase have become bonded to anions containing sulfur. It will further be apparent that where the product of the ion transfer is amine sulfite, the maximum G value obtainable is 0.5, and where the product is amine hydrosulfite, the maximum G value is 1.0. The transfer capability of a particular transfer compound can therefore be judged by the way in which its G value relates to these maximum G values which are attainable in reactions which yield amine sulfite and amine hydrosulfite, respectively. Because kerosene is a relatively inexpensive organic solvent which works well in carrying out the transfer reaction, it has been used as the basis for computing the G value for practical reasons. It should be pointed out, however, than G values can be calculated in reference to other solvents equally expediently.

The numerical magnitude of the G value depends upon the initial hydrosulfite concentration in the aqueous phase and the initial amine concentration in the organic phase in the transfer experiment. When these conditions are kept constant, the G value adequately measures the effectiveness of an amine in effecting hydrosulfite transfer. For this purpose, the G value can be conveniently determined as follows: 10 ml of an aqueous solution containing 3.37 mmols of sodium hydrosulfite per ml is shaken with 16.85 mmols of the long chain amine as amine salt dissolved in an equal volume of kerosene in a separatory funnel for a period of five minutes. The two layers are allowed to separate, and the sulfite content of the organic layer is determined. The G value can then be calculated according to Equation (6).

The selection and use of a transfer reactant having a realtively high G value affords a high transfer per pass (during the cyclic operation of the process), and a correspondingly reduced volumetric recirculation need for the regenerated transfer reactant and its solvent (if one is used) in the operation of the process. The significance of this practical advantage becomes more apparent when it is considered that in the case of transfer reactants having long chain aliphatic substituents, the recirculation of the large molecule transfer reactants entails a realtively high cost of recirculation in relation to the chemical activity of each molecule of the transfer reactant employed.

In reference to the characteristic G values of those transfer reactants which can be used to advantage in the process of the present reaction, I prefer to employ transfer reactants having a G value exceeding 0.15. Above this minimum G value, more suitable results are obtained where the G value is higher than 0.3, and the best results are achieved if such transfer reactant has a G value exceeding about 0.4.

In the selection of transfer agent, organic solubility is also an important consideration. Where the preferred mode of carrying out the present invention is in use, and the transfer reactant is dissolved and recirculated in a suitable organic solvent, it may be noted that the organic solubility of the transfer reactants of the type described can be improved by adding to the organic solvent, as a transfer reactant solubility promoter, from about 3 to 5 weight percent of a long chain alkanol (containing, for example, from about 12 to about 24 carbon atoms).

Within the broadly defined range of chain length and water immiscibility characteristics hereinbefore set forth, it is preferred to use amine salts derived from parent aliphatic amines having a molecular weight in the range of from about 180 to about 650.

There are a number of amines which satisfy the broad criteria above described, as well as the desiderata employed in the selection and use of preferred or most suitable parent amines for amine salt transfer reactants as set forth above. A partial listing of commercially available aliphatic amines which serve well as parent amines of amine salts includes: an isomeric mixture of tertiary alkyl primary amines each having a chain length in the $C_{18}$–$C_{22}$ range, and sold under the tradename Primene JMT; an isomeric mixture of tertiary alkyl primary amines each having a chain length in the $C_{12}$–$C_{14}$ range and sold under the tradename Primene 81R; a mixture of N-dodecenyl-N-trialkylmethyl amines each containing from 24 to 27 carbon atoms and sold under the tradename Amberlite LA-1; and a mixture of N-lauryl-N-trialkylmethyl amines each containing from 24 to 27 carbon atoms, and sold under the tradename Amberlite LA-2 (all the foregoing are marketed by the Rohm & Haas Company of Philadelphia, Pa.; methyl di-(n-octyl) amine and 1-(3-ethylpentyl)-4-ethyloctyl amine. A suitable quarternary amine salt can be derived from a mixture of trialkylmethyl ammonium chloride compounds in which the alkyl substituents are straight chain alkyl groups containing from 8 to 10 carbon atoms. This chloride compound is sold commercially under the tradename Aliquat 336 by General Mills Chemicals, Inc. of Minneapolis, Minn.

As previously indicated, it is preferred to place the transfer reactant in an organic solvent for carrying out the transfer reaction. Solution in an organic solvent improves the flow characteristics of the amine salt and increases the speed of phase disengagement. Organic solvents which can be effectively employed include water-immiscible alcohols, ketones, ethers and esters, and hydrocarbons such as benzene, toluene, xylene, kerosene, heavy naphtha and light gas oil. The solvent selected and used should preferably be non-toxic, of relatively low volatility, substantially water-soluble and chemically inert toward the reactants and any other solvents in the zones in which the transfer reactions are carried out. Kerosene boiling in the range from about 350° F. to about 600° F. is the preferred solvent.

I have experimentally determined that the organo-sulfur-bearing compounds resulting from the transfer reaction can be fairly easily and readily decomposed by subjecting the pregnant organic phase from the transfer reaction to elevated temperature. I have further determined that water catalyzes this decomposition reaction. The decomposition reactions occurring upon heating, with or without water, may be formally represented by equations

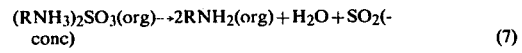

(7)

or

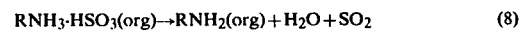

(8)

In the third step of the process of the invention, the organic layer or phase derived from the transfer reaction, and containing amine sulfite and hydrosulfite, is heated to a temperature exceeding about 70° C., and in the case of the sulfite and hydrosulfite of Primene JMT, preferably to about 90° C., to effect the decomposition of the amine sulfites. Preferably, a stripping gas, such as methane, is admitted to the hydraulic thermal decomposition zone concurrently with the heating, and is passed through the organic liquid containing the amine sulfites to provide a stripping action aiding in carrying the product sulfur dioxide out of the thermal decomposition zone. In this way, the sulfur dioxide is produced in concentrated form and may be recovered as such, or reduced to elemental sulfur or converted to sulfuric acid by processes well known and understood in the art. The upper limit of the temperature to which the amine sulfite and hydrosulfites can be heated is dictated by the practical level or value at which chemical deterioration of the amine will commence. After the decomposition, some amine and some small amount of $(RNH_3)H_2PO_4$ from reaction (5a) will interact.

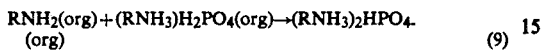

$$RNH_2(org) + (RNH_3)H_2PO_4(org) \rightarrow (RNH_3)_2HPO_4(org) \quad (9)$$

In the final step of the process, the partially regenerated scrubbing solution from the second or transfer step and the organic phase from the third or hydraulic/thermal decomposition step are mixed intimately in a recontacting step. In that "recontact" step, some protons from the scrubbing solution combine with the amines from the hydraulic/thermal decomposition step forming the amine salt. Thus

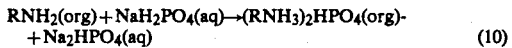

$$RNH_2(org) + NaH_2PO_4(aq) \rightarrow (RNH_3)_2HPO_4(org) + Na_2HPO_4(aq) \quad (10)$$

Referring to equation (10), the extent to which this reaction will take place depends the basicity of the amine, and the pKa value of the parent acid of the alkali metal salts involved in the reaction (i.e., parent acid $H_2PO_4^-$ in the above reaction). As discussed in my U.S. Pat. No. 3,984,529, it is of advantage to select, as scrubbing reactants, salts derived from weak acids having a pKa value in the range of from about 5 to 10, and more preferably from about 7 to about 8. A preferred salt is sodium monohydrogen phosphate derived from the corresponding parent acid $H_2PO_4^-$.

As stated earlier, it is generally advantageous to use amine salts as transfer agents which contain the same anion as the scrubbing agent.

Concerning the basicity of amine, a primary alkyl amine is generally preferred, and tertiary alkyl primary amines are most preferred. Amine with nitrogen in the six member ring is too weak a base to be suitable.

Not infrequently, the gaseous mixture from which the sulfur dioxide is to be removed by the process of the present invention will also contain some $SO_3$. In such cases, sulfate compounds will also be present in the spent scrubbing liquor. Sulfate ions will be transferred, similarly to the sulfite ions, to the organic transfer reactant and will, over a period of continuous operation and recycling, begin to accumulate and build up in the organic phase employed in the transfer reaction. In such instances, the sulfate level in the organic phase is controlled by subjecting a side stream split off from the recirculated amine (following the decomposition of the sulfite and hydrosulfite compounds) to contact with an alkaline solution, such as sodium hydroxide or ammonium hydroxide. Contact with the alkaline solution effectively removes substantially all of the sulfate ions as a result of chemical combination with the basic cations contained in the alkaline solution. Any small quantity of sulfite or hydrosulfite ions which remain in the organic phase after the thermal decomposition and stripping operation, and some phosphate ions, are also removed. The washed and regenerated organic phase in the slip stream, which now contains the amine transfer reactant in the organic solvent, is then returned to the main organic stream and recycled to the zone in which the recontact is carried out in the fourth step of the process. The sodium sulfate, sulfite and phosphate compounds produced by the described scrubbing of the slip stream can be treated to recover the salts therefrom. Alternatively, the sodium ion can be replaced by calcium ions, and calcium sulfate then becomes the major final by-product of the process. By the use of the latter procedure, there is no sodium lost from the system, although some relatively low value by-product material is produced.

EXAMPLE

Employing the system schematically illustrated in the drawing, approximately 240,000 standard cubic feet per minute of flue gas generated by a 100 mw power plant which burns a 3 weight percent sulfur coal is treated. The flue gas is discharged from the plant at a temperature of 300° F., and is constituted, on a per minute basis, of essentially 4,190 lbs. of $CO_2$, 99.6 lbs. of $SO_2$, 598 lbs. of $O_2$, 14,120 lbs. of $N_2$ and 891 lbs. of water vapor. The flue gas is charged via a conduit 10 to the bottom of a conventional scrubber 12, and is moved upwardly in the scrubber countercurrently to a scrubbing solution discharged from a nozzle 14 in the top of the scrubber, and gravitating downwardly therefrom.

Though the schematic illustration of the scrubber does not illustrate its details of construction, it is of the type described in U.S. Pat. No. 3,984,529, and consists of three separate absorption stages. At each stage, the scrubbing solution flows downwardly from the top of the scrubber countercurrently to the flow of upwardly rising flue gas, and is collected in a sump situated at the bottom of each of the stages. From each sump, a portion of approximately 4/5 of the scrubbing solution is recycled by a suitable pump to the top of the same stage, and another portion of approximately 1/5 of the liquid is charged to the top of the next lower stage. Thus, while a major portion of the scrubbing solution is constantly recycling within each stage, there is a minor portion of the scrubbing liquid passing downwardly from stage to stage and eventually withdrawn from the bottom of the scrubbing column for regeneration treatment.

About 90 percent of the $SO_2$ in the flue gas is removed by the scrubber column 12, and the clean flue gas, consisting essentially of 4,190 lbs. (per minute) of $CO_2$, 10.0 lbs. of $SO_2$, 598 lbs. of $O_2$, 14,120 lbs. of $N_2$ and 1,780 lbs. of water vapor is eluted from the top of the scrubbing column at about 128° F.

The material recycled from the sump at the bottom or lower-most stage within the column is recycled to the top of the scrubber column 12 by a suitable pump 16.

Regenerated scrubbing solution from a conduit 20 and produced in the manner hereinafter described, is admitted via nozzle 14 to the top of the scrubber 12 each minute, and consists of 119.4 lbs. of disodium phosphate, 8.4 lbs. of monosodium phosphate, 25.3 lbs. of sodium sulfite, 0.73 lbs. of sodium hydrogen sulfite and 1634 lbs. of water at 70° F. To this stream, make-up water at 70° F. has been added at the rate of 890 lbs. per minute from the conduit 22.

A slip stream derived from the recycling scrubbing solution directed from the pump 16 to the top of the scrubbing column is passed through a conduit 24, and is constituted, on a per minute basis, of 19.9 lbs. of disodium phosphate, 160 lbs. of monosodium phosphate, 8.4 lbs. of normal sodium sulfite, 161.2 lbs. of sodium hydrogen sulfite and 744 lbs. of water. The slip stream is initially passed to a pump mixer 26, where it is intimately mixed with regenerated organic transfer reactant solution from the conduit 28 and constituted as hereinafter described.

The regenerated organic transfer reactant solution charged to the pump mixer 26 via conduit 28 consists of 971.6 lbs. of diprimene monohydrogen phosphate, 142.6 lbs. of diprimene sulfite and 880.3 lbs. of kerosene with the stream at 70° F. (on a per minute basis). The volume ratio of the total Primene salts to kerosene present in the organic solution is 1.

From the pump mixer 26, the solution comprising an intimate mixture of both the aqueous and organic phases is charged to a holding column 30, where the two layers are permitted to separate. The aqueous layer, which is the partially regenerated scrubbing liquor, is constituted by 6 lbs. of disodium phosphate, 244.3 lbs. of monosodium phosphate, 8.4 lbs. of normal sodium sulfite, 30 lbs. of sodium hydrogen sulfite and 744 lbs. of water. This aqueous layer is sent to a recontact pump mixer 44 in which the protons from the aqueous stream are transferred to an amine organic stream.

The organic layer from the top of the holding column 30 is charged via a conduit 36 to another pump mixer 37. The material passed through the conduit 36 is constituted, each minute, by 97.3 lbs. of diprimene monohydrogen phosphate, 110.6 lbs. of monoprimene dihydrogen phosphate, 804.4 lbs. of diprimene sulfite, 106.1 lbs. of monoprimene hydrogen sulfite and 880.5 lbs. of kerosene. Also admitted to the pump mixer 37 is a regenerated water stream via conduit 39. Steam and optionally other stripping gases, such as methane or a suitable tail gas delivered from a Claus reactor, are also admitted. The steam retains the temperature at a desirable level of about 90° C. From the pump mixer, the mixture enters another holding tank 38 where the two layers are allowed to separate. The aqueous layer, having apprixi- mately the same volume as the organic layer, is recycled via conduit 39 as above described. From the top of the holding tank 38, 89.9 lbs of $SO_2$ per minute is continuously withdrawn, and can be liquified, converted to elemental sulfur or converted to sulfuric acid.

Decomposition of the Primene sulfite and concurrent removal of sulfur dioxide regenerate the Primene JMT. The Primene stream constituting 290.6 lbs of diprimene monohydrogen phosphate, 47.3 lbs. of diprimene sulfite, 668 lbs. of primene and 880 lbs. of kerosene is continuously withdrawn from stripping column 38 and, by means of a pump 42, is admitted to 'recontact' pump mixer 44 in admixture with an aqueous layer from column 30.

In the pump mixer 44, Primene is largely converted to diprimene monohydrogen phosphate which is used to transfer additional sulfite ions from the pregnant scrubbing liquid in a transfer reaction of the type described. After recontact in the pump mixer 44 to form the diprimene monohydrogen phosphate, the mixture from the pump mixer 44 is charged to the holding column 46 where separation of the organic phase from the aqueous phase, which is the regenrated scrubbing solution, is permitted to occur. The organic layer, which is the regenerated transfer reactant solution, is then withdrawn from the holding column 46 by a suitable pump 50, and is recycled to the pump mixer 26 via conduit 28. The regenerated scrubbing solution is withdrawn from the bottom portion of the holding column 46 by a pump 48 and is returned to the scrubbing column.

Reference has previously been made herein to the method employed for removing any sulfate which may be developed in the organic transfer reaction phase as a result of the presence of some $SO_3$ in the stack gas treated. Where Primene sulfate is present in the pregnant or spent organic transfer solution, it will normally not be thermally decomposed, as in the case of the sulfite, but will be carried out of the stripper column 38 with the regenerated transfer reactant solution. Since the sulfate content will continue to build up over a period of time, and thus inactivate increasing quantities of the Primene in relation to effective sulfite absorption capability, it is desirable to remove the sulfate ions from the regenerated transfer reactant solution. For this purpose, an absorption column 52 containing an alkaline solution, such as ammonium hydroxide or sodium hydroxide, is used for intimately contacting a slip stream split off from the recycled regenerated organic transfer reactant discharged from conduit 41 and pump 42. The sulfate-containing organic solution passed through the column 52, and undergoing intimate liquid-liquid contact with the alkaline solution therein, is freed of the sulfate ion as a result of the formation of alkali sulfate. The organic phase ascends to the top of the column and separates from the more dense aqueous alkaline solution with which it is immiscible. From the top of the column, the sulfate-free slip stream is then remerged with the main stream of regenerated organic transfer reactant and passed to the "recontact" pump mixer 44. The described expedient can be used in the practice of the process of the invention for keeping the organic transfer reactant sufficiently free of sulfate ion to prevent frequent down-time requirements, and to permit continuous operation of the process over extended periods of time.

Although certain preferred embodiments of the present invention have been herein described in order to illustrate the basic principles upon which the effectiveness and operativeness of the invention are based, it will be understood that various changes and innovations in the process conditions and reaction parameters can be effected without departure from such basic principles. Changes and innovations of this type are therefore deemed to be circumscribed by the spirit and scope of the invention, except as the same may be necessarily limited by the appended claims or reasonable equivalents thereof.

What is claimed is:

1. A process for removing sulfur dioxide from a gaseous mixture comprising:
   contacting the gaseous mixture in a scrubbing zone with a removal reactant consisting essentially of an aqueous solution of a first salt of an alkali metal to form an aqueous solution of an alkali metal hydrosulfite salt, said first salt being derived from a weak acid having a pKa value which is at least 3.5;
   contacting, in a transfer reaction zone, the aqueous solution of said alkali metal hydrosulfite salt with a transfer reactant consisting of an organic phase which does not form a stable emulsion with water, and includes at least one aliphatic amine salt containing from about 8 to about 45 carbon atoms, and having a solubility in water of less than about 5 gms of the amine salt per 100 gms of water at 25° C., and having a transfer capability, G, which is greater than 0.15, said amine salt being derived from the reaction of an amine with a weak acid having a pKa value which is at least 3.5, to yield an organic liquid phase containing, by a transfer reaction, at least one sulfur-containing amine salt, and an aqueous solution phase containing a second alkali metal salt differing from said first alkali metal salt and reactable with free amine derived from said sulfur-containing amine salt to yield said first alkali metal salt;

heating the organic liquid phase to decompose the sulfur-containing amine salt to yield sulfur dioxide and a free amine; then contacting at least a portion of said free amine with at least a portion of said second alkali metal salt to reconstitute said amine salt and concurrently reconstitute said first alkali metal salt.

2. A process as defined in claim 1 wherein said reconstituted amine salt is recycled to said transfer reaction zone, and said reconstituted first alkali metal salt is recycled to the point of contact of said aqueous solution of said first alkali metal salt with said gaseous mixture.

3. A process as defined in claim 1 wherein said first alkali metal salt is $Na_2HPO_4$.

4. A process as defined in claim 1 wherein said amine salt and said first alkali metal salt are characterized by the inclusion of a common anion as a result of their derivation from a common weak acid having a pka value of at least 3.5.

5. A process as defined in claim 1 wherein said amine salt is diamine monohydrogen phosphate.

6. A process as defined in claim 1 wherein heating of the organic liquid phase to decompose the sulfur-containing amine salt is carried out in the presence of a catalytic amount of water.

* * * * *

UNITED STATES PATENT OFFICE
CERTIFICATE OF CORRECTION

Patent No. 4,211,761                    Dated July 8, 1980

Inventor(s) Shao E. Tung

It is certified that error appears in the above-identified patent and that said Letters Patent are hereby corrected as shown below:

Column 6, line 46, delete:

"$(RNH_3)_2HPO_4(org) + 2Na_2HPO_4(aq) \rightarrow 2(RNH_3)$"

and insert:

-- $(RNH_3)_2HPO_4(org) + 2NaH_2PO_4(aq) \rightarrow 2(RNH_3)$ -- .

Signed and Sealed this

*Twenty-first* Day of *October 1980*

[SEAL]

*Attest:*

SIDNEY A. DIAMOND

*Attesting Officer*      *Commissioner of Patents and Trademarks*